Inventors:
Adolf Schnürle
Otto Elwert

Patented Oct. 19, 1937

2,096,203

UNITED STATES PATENT OFFICE 2,096,203

REGULATING DEVICE FOR INTERNAL COMBUSTION ENGINES

Adolf Schnürle and Otto Elwert, Stuttgart, Germany; said Elwert assignor to said Schnürle Application August 24, 1934, Serial No. 741,302
In Germany September 1, 1933

13 Claims. (Cl. 123—140)

This invention relates to a regulating apparatus for Diesel engines for vehicles in which the maximum values of fuel are adjustable in accordance with the engine speeds.

In high speed four stroke Diesel engines, particularly vehicle engines, the amount of air drawn into the cylinders varies with the speed, decreasing at high speeds. Also at the lower speeds, the amount of air in the cylinders decreases on account of the losses occasioned by the looseness of the piston rings. Heretofore, the maximum value of the combustible fuel for all speeds has usually been determined by the maximum value at the highest speeds, which was effected by a stop on the regulator bar.

Since the motor draws in more air at medium and low speeds than at high speeds, too little fuel is injected into the motor at the first-mentioned speeds. Upon increasing the maximum amount of fuel at these speeds, the torque and the output of the motor are also increased. An increase of the maximum torque of the engine at low speeds is highly advantageous and increases the flexibility of the engine. Conversely, upon the adjustment of the maximum amount of fuel for average speeds and the maintenance of this adjustment constant for all speeds, at high speeds too much fuel is injected corresponding to the diminished amount of air at these speeds, so that the engine smokes.

In order to obtain a high output and a perfect combustion at all speeds, it is desired that the quantity of fuel injected into the cylinders always corresponds to the amount of air. In accordance with the invention, this object is attained by the regulating member for the fuel supply being controlled by hand or by the usual automatically operating fuel regulator, i. e., speed regulator, in addition to a device which is influenced in dependency upon the speed. This device adjusts the varying maximum amounts of fuel according to the different engine speeds. This device may be separate from the hand control or the speed regulator respectively or may be built together therewith.

The maximum torque or turning moment of the motor depends wholly on the highest possible amount of injected fuel. By fixing the highest possible amount of fuel which may be injected into the engine cylinder, it is possible thereby to arbitrarily vary the curve of greatest torque.

The variation of the maximum values of the injected fuel is not only of importance for four stroke cycle Diesel engines but also for two stroke cycle engines, because in the latter case as well, the charging of the cylinders with fresh air in the scavenging thereof varies in dependency upon the engine speed.

The invention may be best understood by the following description taken in conjunction with the accompanying drawings, wherein, Fig. 1 is a longitudinal sectional view with certain parts in elevation of a regulating arrangement, which incorporates springs to obtain the desired regulating effects, Fig. 2 is a section through the fuel pump at right angles to Fig. 1.

Figure 2:
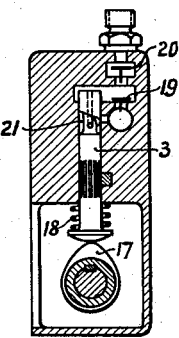
Figure 1:
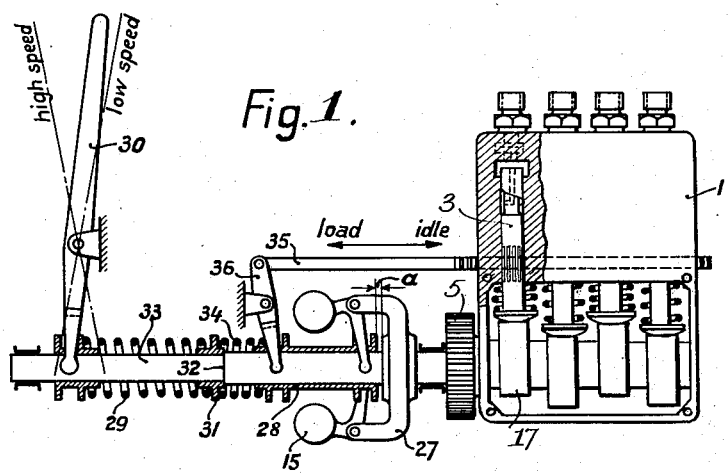

Fig. 1 shows a fuel injection pump 1 of a well-known type. The shaft 33 actuating the four plungers 3 by cams 17 is driven from the crank shaft (not shown) by means of a gear wheel 5. On the same shaft 33 is mounted a usual centrifugal governor 27, having weights 15, which is so constructed as to vary according to the load the fuel injected by the pump during a low idle speed and also for the maximum working speed of the engine. The movement of sleeve 28 is transmitted by means of the lever 36 to the regulating bar 35 of the fuel pump 1.

Figs. 1–6 show embodiments of the invention, in which the adjustment of the maximum amounts of fuel is effected by means of a short spring which acts upon the governor sleeve, together with the spring controlling the speed of the engine.

A governor spring 29, which is set manually by means of hand lever 30, adjusts the speed of the engine. Upon the compression of the spring 29, the engine is adjusted for a high speed, and upon the release of the spring, the speed adjustment is lowered. In the constructions of such a regulating arrangement known heretofore the spring 29 abuts directly against the governor sleeve. In contradistinction thereto, in this case, the spring 29 presses against a plate 31. The plate 31 abuts against a shoulder 32 of the governor spindle 33. Between the plate 31 and the governor sleeve 28 is disposed a relatively short spring 34. The governor sleeve 28 is pressed against the spring 34 by the centrifugal force of the weights 15, whereby the spring 34 is pressed together somewhat, so that the sleeve travels the distance a before lifting the plate 31 off the shoulder 32. At low speeds, the spring 34 is compressed less than at high speeds since the main spring 29 at low speeds is set to a smaller tension. The more the spring 34 is compressed, that is, the larger the travel a of the sleeve, the lesser is the maximum amount of fuel which can be injected. The regulating rod 35 is made in the form of a rack bar at one end, the teeth of which engage the toothed part of pump plungers 3. These plungers are actuated on the pressure stroke by revolving cams 17, and on the suction stroke by springs 18. Fuel is drawn into the pumping space through suction valves 19 and forced out through the injection valve in the engine cylinder through pressure valves 20. A recess 21 of the plungers is always connected with the pressure space and is limited at the upper side by a sloping edge, which, according to the angular position of the plungers, connects the pressure space with the suction space earlier or later in the pumping stroke, and thus terminates the effective stroke.

Figure 3:
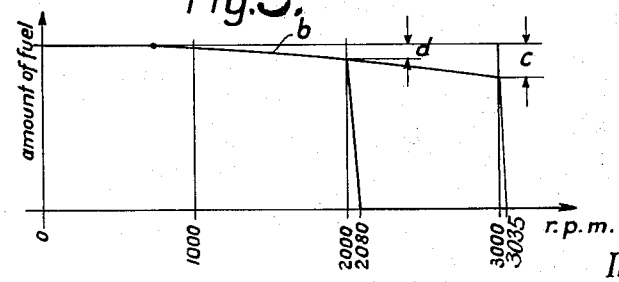
Fig. 3 shows a schematic diagram of operation of the regulating arrangement shown in Fig. 1.

The operation of this arrangement is illustrated in a diagram, Fig. 3. The abscissas represent the engine speeds, and the ordinates, the amount of fuel or the travel of the governor sleeve to the right. Upon the setting of the governor spring 29 by means of the hand lever 30 at a high speed, for instance 3000 R. P. M., the spring 34 is compressed by the governor sleeve 28 up to a speed of 3000. On account of the strong compression of the spring 29, not until this speed of 3000 revolutions is reached does the sleeve 28 by means of the spring 34 begin to compress the spring 29 and to cut off the fuel entirely at 3035 R. P. M., corresponding to a degree of irregularity of about 1%. Therefore, up to 3000 revolutions, the fuel pump is adjusted for full load. At speeds between 3000 and 3035, the engine is partially loaded, and above the speeds of 3035 the fuel pump is cut off. At 3000 the greatest amount of fuel is diminished by c as compared with that amount for low speeds. At 2000 R. P. M., which are regulated by the governor at a lesser precompression of spring 29 by the hand lever 30, the maximum amount of fuel is smaller than that for low speeds only by d. At this setting of spring 29, if the load decreases, the fly-balls lift and finally cut off the fuel altogether at 2080 R. P. M. which corresponds to 4% irregularity.

Thereby, it is possible by means of the special supplementary spring 34 disposed between the ordinary governor spring and the governor sleeve to decrease in a simple manner the maximum amounts of the fuel injected for higher speeds.

The application of the supplementary spring according to the invention is of course not limited to that kind of governor illustrated in Fig. 1. It might be used in any speed regulating device, as e. g. in a Jahns-governor or in a pneumatic or hydraulic governor. In the regulating arrangements shown in Fig. 1 the sleeve 28 is moved to and fro by means of the weights 15 and is pressed against the springs. In the case of hydraulic or pneumatic regulating arrangements, in which the air or fluid is placed under pressure by means of a pump such as a gear pump, and this pressure is effective upon a piston, it is possible for this piston to exercise its control instead of the governor sleeve. Thereby, the arrangement of the springs which press against the piston may be the same as that shown in Fig. 1. Therefore, the regulating arrangement according to Fig. 1 is also adapted to a hydraulic or pneumatic governor.

Aside from fuel injection engines which receive decreasing cylinder charges of air with increasing speed and consequently require decreasing maximum amounts of fuel, there are also such combustion engines in which combustion is improved from the low idle operation speed up to a medium speed on account of greater air velocity and dispersion of the fuel, so that an increase of the permissible maximum value of the fuel up to a medium speed is required.

In motors using super-charging air, in which an increase in speed results in an increasing charging pressure on account of smaller leakage losses, and thereby increasing cylinder charges, increasing amounts of fuel can be injected and burned at increasing speeds. Thereby the permissible maximum amount of fuel experiences a continually rising course from a minimum value at the lowest speed up to a maximum value at the highest speed.

Furthermore, the curve of the maximum values of the fuel sprayed into the engine cylinders may be determined, within permissible limits for complete combustion, by a desired torque performance or output of the motor.

Often the course or curve of the maximum fuel values consists of a rising portion and a falling portion. It might also be necessary to maintain the portion of the curve for the maximum fuel values horizontal for a predetermined range of speeds, wherein the maximum values experience no variation. The curve may thus be composed generally of three parts, of which one is a rising portion, another a horizontal portion, and another a falling portion, these occurring in any desired sequence. The curve may also be lacking in any one of these parts.

Figs. 4-7 illustrate an apparatus to obtain a regulation such as described above, in which the injection or spraying of the maximum amounts of fuel with increasing speed follows a predetermined curve.

Figure 4:
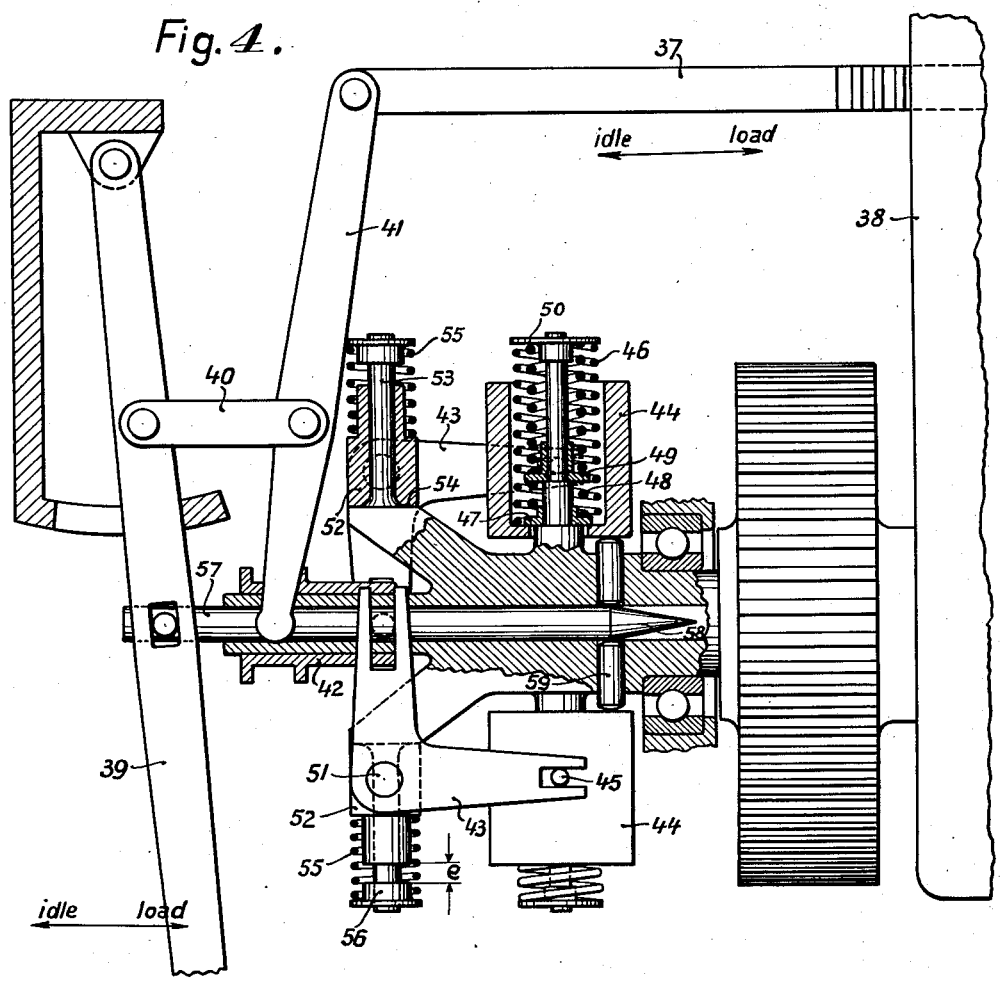
Fig. 4 is a longitudinal sectional view with certain parts in elevation of another embodiment of the regulating arrangement at the setting for maximum load at idle speed operation.

The regulating bar 37 of the partially illustrated fuel pump 38 in Fig. 4 is controlled, on the one hand, by the control lever 39, link rod 40 and lever 41, on the other hand, by means of the sleeve 42 of the illustrated governor. The sleeve 42 is moved by bell-crank levers 43, and thereby the amount of injected fuel is determined.

In known manner, the idle run and final speeds are controlled by the oppositely disposed weights 44, the upper one of which is shown in section in Fig. 4, and the lower one in elevation. Both weights 44 transmit their movements to the governor sleeve 42 by means of the bell-crank levers 43 engaging with trunnions 45 on the weights 44. The idle run regulation is effected by means of the weights 44 by the compression of the springs 46. With increasing speeds, in order to effect a decrease of the maximum amount of fuel for a predetermined range of speeds before the attainment of the final speed, the disc 47 abuts through the intermediary of spring 48 and the disc 49 against the spring 50 similarly to the arrangement shown in Fig. 3. The disc 47 as well as the spring 46 abut against the weight 44. With increasing speed, for example at speeds between 2000 and 3000 R. P. M., as illustrated by the diagram, Fig. 5, the intermediate spring 48 becomes effective in the same manner as described above in conjunction with the previously described modification.

However, the weights 44 and the springs disposed therein in this construction are only capable of effecting a decrease of the maximum values of fuel with increasing speeds and vice versa. In governors for the maximum amounts of fuel which require an increase in the maximum fuel values at increasing speeds for a predetermined range of speeds, the weights are not adequate. For this purpose, other means must be provided having an opposite regulating effect to the one disclosed above. Therefore, the fulcrums 51 of the angular levers 43 are not mounted rigidly in the governor shaft or in a part fixedly connected therewith, but in shiftable weights 52. Each of the two oppositely disposed weights 52 is shiftably mounted and guided in an outward direction on bolts 53. These guiding bolts are rigidly mounted upon the shaft.

Figure 6:
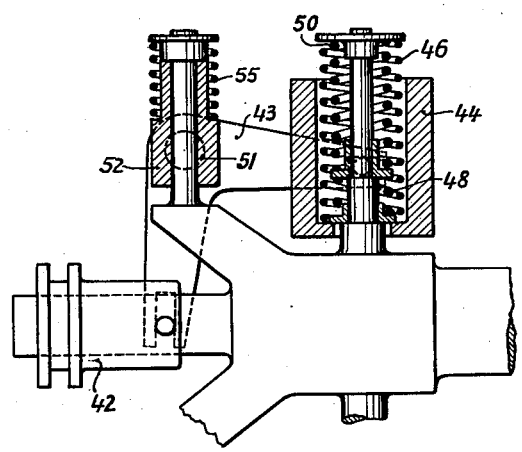
Fig. 6 is a detailed view of a portion of Fig. 4 with the setting of the parts for medium speed operation.
Figure 7:
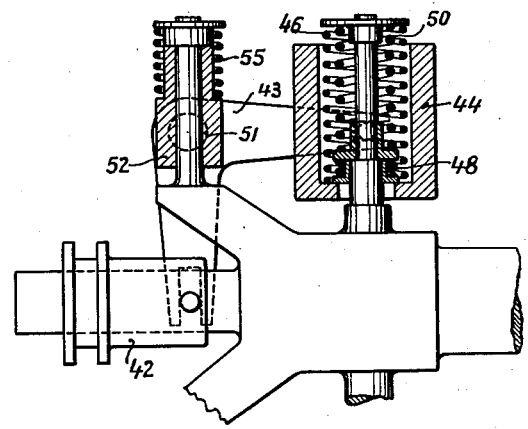
Fig. 7 is a detailed view of a portion of Fig. 4 with the setting of the parts for high speed operation.

The weights 52 are pressed inwardly against a rigid stop 54 by means of strong springs 55. In a predetermined speed range, for instance between 400 to 1500 R. P. M., the weights 52 move outwardly for the stroke e until they come to abut against the spring stop 56. The last-mentioned position is shown in Figs. 6 and 7. In this movement of weights 52, the fulcrums 51 of the angular levers 43 also move outwardly. This has the result, that for an unchanged position of the trunnions 45 on the weights 44 of the first governor, the angular levers 43 execute a rotary movement about the trunnions 45, which at increasing speed effects a shifting of the governor sleeve 42 to the left and thereby an increase of the amount of fuel, and also of the maximum amount of fuel Since in addition to the mass of the weights 52, the mass of the angular levers 43 give rise to centrifugal forces, the secondary governor makes large governing forces available.

The connection of the two centrifugal governors results therefore in a combined actuation of the angular levers 43. The complete governor assembly is effective upon the single sleeve 42.

In Fig. 4 the control lever 39 is shown in full load position. The adjusted position of the regulator bar 37 of the pump 38, obtained by the cooperation of the control lever 39 in its full load position and the regulator sleeve 42 in the designated setting for 400 R. P. M. according to the diagram Fig. 5, is that for the permissible maximum value of the fuel at this speed.

At a lowering of the speed below 400 R. P. M., the governor springs 46 would normally become effective and the sleeve 42 would shift further to the left from its position shown in Fig. 4, whereby at the same full load setting of the control lever 39, an increase of the maximum amount of fuel over the permissible value would result, which is undesired. In order to prevent this a rod 57 is provided coaxially inside the governor shaft having a conical point 58, which moves two pins 59 outward when shifted to the right by the control lever 39. The pins 59 limit the movement of the weights 44 inwardly more and more, as the control lever is set from its idle position to full load. This device serves to exclude the above effect of the idle operation governor at increasing loads.

Figure 5:
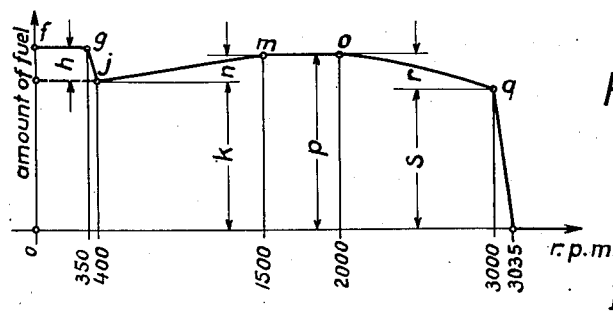
Fig. 5 shows a schematic diagram of the operating movement of the governor sleeve according to Fig. 4.

The operation of the regulating device described is illustrated in Fig. 5. The illustrated curve shows, similarly to Fig. 3 the greatest amount of fuel or the movements of the governor sleeve respectively in dependency upon the speed.

At the following revolutions per minute, the following conditions take place:

0–350.—Control lever 39 to the left (running idle). The sleeve remains in the same position from $f$ to $g$. The greatest amount of fuel equals $h$.

350–400.—Control lever to the left. If the load decreases to zero, the sleeve travels from $g$ to $j$, the fuel becoming zero at $j$.

If the control lever is set to the extreme right, the greatest amount of fuel equals $k$ between 0 and 400 R. P. M., as indicated by the dotted line.

400–1500.—Control lever to the right (full load). The governor weights 52 move outwardly and the curve rises from $j$ to $m$. The movement of the governor sleeve causes a gradual increase by $n$ of the maximum amount of fuel.

1500–2000.—The sleeve remains stationary from $m$ to $o$, the same is true of the maximum amount of fuel equalling $p$.

2000–3000.—The weights 44 move outwardly compressing the springs 48, and the sleeve travels from $o$ to $q$, effecting a gradual decrease by $r$ of the maximum amount of fuel to $s$.

Beyond 3000.—The springs 50 are compressed and the sleeve moves rapidly from $q$ to its zero setting, which is attained at a speed of 3035 R. P. M. Thereby the injection of the fuel is stopped.

By suitable alteration of the arrangement and the compression of springs and of the shoulders it is possible to overlap the effective range of speeds of the two centrifugal governors to obtain predetermined transitions between the parts of the maximum fuel curve. The automatic regulation of the desired course of the maximum fuel curve in dependency upon the instantaneous speed may also be combined with a speed regulator in a manner similar to that for light running and final speeds.

Centrifugal and hydraulic or pneumatic governors may naturally be combined and arranged in a different manner directly or by suitable transmission means. Furthermore, there is the possibility of rendering effective the centrifugal force of weights or the pressure force of pressure means upon the regulating bar for the fuel pump through the intermediary of curved pieces or cams in order to obtain an automatic regulation of the maximum amounts of fuel. By a suitable division of the springs which are used in the governors and the fly weights in the same governor structure, a suitable course of the maximum values of the fuel in dependency upon the speed may be adjusted.

What we claim is:

1. In a regulating device for fuel feeding apparatus for Diesel engines for vehicles, means for adjusting the quantity of fuel fed for each work stroke of the engine, means responsive to the engine speed connected with said adjusting means, resilient means opposing movement of said speed responsive means comprising a fuel shut-off control spring and a supplementary spring interposed between said shut-off control spring and said speed responsive means, said springs tending to move said adjusting means to increase the fuel feed, abutment means limiting expansion of said shut-off control spring, and manually operative means for changing the range of speed within which said adjusting means is controlled by said speed responsive means.

2. In a regulating device for fuel feeding apparatus for Diesel engines, a fuel controlling element for adjusting the quantity of fuel fed for each work stroke of the engine; means for controlling the operation of said element comprising a spring, an abutment for one end of said spring limiting the movement of said end in one direction only, means for adjustably compressing said spring at the end thereof opposite said abutment corresponding to a desired speed, a speed-responsive member connected to said element and adapted to act upon the end of said spring at said abutment end of said spring, a supplementary spring between said abutment and said speed-responsive member, said supplementary spring being adapted to be compressed by the movement of said speed-responsive member at increasing speeds to vary automatically the maximum amount of fuel adjusted by said fuel controlling element according to the different speeds of the engine.

3. In a regulating device for fuel feeding apparatus for Diesel engines, a fuel controlling element for adjusting the quantity of fuel fed for each work stroke of the engine; means for controlling the operation of said element comprising a spring, an abutment for one end of said spring limiting the movement of said end in one direction only, means for adjustably compressing said spring at the end thereof opposite said abutment corresponding to a desired speed, a speed-responsive member connected to said element and adapted to act upon the end of said spring at said abutment end of said spring, a supplementary spring between said abutment and said speed-responsive member, said supplementary spring being adapted to be compressed first by the movement of said member at increasing speeds to decrease automatically the maximum amount of fuel adjusted by said fuel controlling element according to the increasing speed of the engine, and said member being adapted to act through said compressed supplementary spring against the end of said spring at said abutment to overcome the adjusted compression of said first spring and to thereby cut off the fuel at the speed corresponding to the adjustment of said first spring.

4. In a regulating device for fuel feeding apparatus for Diesel engines; means for adjusting the quantity of fuel fed for each work stroke of the engine; manually operative means for shifting said adjusting means from idling speed to high speed position; a speed responsive member connected to said adjusting means; a spring for controlling the movement of said member when said manually operative means are set for idling speed; a second spring for controlling the movement of said member at high engine speed; and a supplementary spring between said speed responsive member and said second spring adapted to vary automatically the range of adjustment of said adjusting means according to the increasing speed of the engine; said speed responsive member compressing said first spring first, said supplementary spring next, and said second spring last, to cut off the supply of fuel at the limit speed of the engine.

5. In a regulating device for fuel feeding apparatus for Diesel engines; means for adjusting the quantity of fuel fed for each work stroke of the engine; manually operative means for shifting said adjusting means from idling speed to high speed position; a speed responsive member connected to said adjusting means; a spring for controlling the movement of said member when said manually operative means are set for idling speed of the engine; said speed responsive member acting upon one end of said spring; means for holding the opposite end of said spring; a second, stronger spring for controlling the movement of said member at high speed of said engine, bearing at one end against said holding means; an abutment for the other end of the said second spring for holding the same in pre-compressed condition; a third supplementary spring between said speed responsive member and said abutment end of said second spring; said last-mentioned spring adapted to be compressed by movement of said member to decrease automatically the upper limit of the range of adjustment of said adjusting means, according to the increasing speed of the engine; said first spring adapted to be compressed by said member to cut off the fuel at the idling speed of the engine, when said manually operative means are set for idling speed; and said second spring adapted to be compressed through the intermediary of said supplementary spring, by the movement of said member, to cut off the supply of fuel at the limit speed of the engine, when said manually operative means are in high speed position.

6. In a regulating device for fuel feeding apparatus for Diesel engines; means for adjusting the quantity of fuel fed for each work stroke of the engine; means for controlling the operation of said adjusting means, comprising a main speed responsive means; connections between the latter and said adjusting means; auxiliary speed responsive means acting upon said connections so as to shift said adjusting means in a direction contrary to that of said main speed responsive means with increasing speed; and a plurality of resilient means respectively balancing said main and auxiliary speed responsive means with different degrees of force.

7. In a regulating device for fuel feeding apparatus for Diesel engines; means for adjusting the quantity of fuel fed for each work stroke of the engine; means for controlling the operation of said adjusting means, comprising a main speed responsive means; lever connecting means between the latter and said adjusting means, operating about a fulcrum; auxiliary speed responsive means acting on said fulcrum to shift the same and thereby to shift said adjusting means with respect to said main speed responsive means; and a plurality of resilient means respectively balancing said main and auxiliary speed responsive means with different degrees of force.

8. In a regulating device for fuel feeding apparatus for Diesel engines; means for adjusting the quantity of fuel fed for each work stroke of the engine; means for controlling the operation of said adjusting means, comprising a main speed responsive means; connecting means between the latter and said adjusting means, comprising a bellcrank lever having one arm connected to said main speed responsive member and the other arm connected to said adjusting means; auxiliary speed responsive means upon which the apex of said bellcrank lever is fulcrumed; and a plurality of resilient means respectively balancing said main and auxiliary speed responsive means and acting thereon with different degrees of force.

9. Apparatus as described in claim 30, wherein said resilient means balancing said main speed responsive means comprise a spring yielding at idling speed of the engine, a second, highly pre-compressed spring yielding only near the limit speed of the engine, and a short auxiliary spring precompressed only sufficiently to yield at a speed between the speeds at which said first and second springs yield, said auxiliary spring yielding only sufficiently to reduce the maximum fuel feed set by said adjusting means within a limited range.

10. In a regulating device for fuel feeding apparatus for Diesel engines; means for adjusting the quantity of fuel fed for each work stroke of the engine; means for controlling the operation of said adjusting means, comprising a main speed responsive means; connections between the latter and said adjusting means; auxiliary speed responsive means acting upon said connections so as to shift said adjusting means in a direction contrary to that of said main speed responsive means with increasing speed; a plurality of resilient means respectively balancing said main and auxiliary speed responsive means with different degrees of force; and manually operative means for shifting said adjusting means for different speeds.

11. In a regulating device for fuel feeding apparatus for Diesel engines; means for adjusting the quantity of fuel fed for each work stroke of the engine; manually operative means for shifting said adjusting means from idling speed to high speed position; a speed responsive member connected to said adjusting means; a spring for controlling the movement of said member when said manually operative means are set for idling speed; a second spring for controlling the movement of said member at high engine speed; a supplementary spring between said speed responsive member and said second spring adapted to vary automatically the range of adjustment of said adjusting means according to the increasing speed of the engine; said speed responsive member compressing said first spring first, said supplementary spring next, and said second spring last, to cut off the supply of fuel at the limit speed of the engine; and a stop device operated by said manually operative means on shifting to high speed position, said stop device being adapted to limit movement of said speed responsive means tending to increase the fuel feed at speeds below idling speed.

12. In a regulating device for fuel feeding apparatus for Diesel engines; means for adjusting the quantity of fuel fed for each work stroke of the engine; means for controlling the operation of said adjusting means, comprising speed responsive means connected therewith and a plurality of springs acting on said speed responsive means and limited in their expansion by abutments so as to become effective in the control of said speed responsive means within different speed ranges, said speed responsive means, springs, and abutments being so arranged as to permit said speed responsive means to move in one direction within one speed range and in the opposite direction within another speed range, and means for superimposing manually controlled movements of said adjusting means on the movements caused by said speed responsive means, the upper limit of the range of said manually controlled movements being raised by said speed responsive means as the engine speed increases within one speed range and being lowered as the engine speed increases within another speed range.

13. In a regulating device for fuel feeding apparatus for Diesel engines; means for adjusting the quantity of fuel fed for each work stroke of the engine; means for controlling the operation of said adjusting means, comprising speed responsive means connected therewith and a plurality of springs acting on said speed responsive means and limited in their expansion by abutments so as to become effective in the control of said speed responsive means within different speed ranges, said speed responsive means, springs, and abutments being so arranged as to permit said speed responsive means to move in one direction within one speed range and in the opposite direction within another speed range, and means for superimposing manually controlled movements of said adjusting means on the movements caused by said speed responsive means, the upper limit of the range of said manually controlled movements being raised by said speed responsive means as the engine speed increases within one speed range, being maintained constant as the engine speed increases within another speed range, and being lowered as the engine speed increases within another speed range.

ADOLF SCHNÜRLE.
OTTO ELWERT.